July 24, 1951 R. M. MAGNUSON 2,561,477
QUICK FREEZE APPARATUS AND METHOD
Filed Feb. 19, 1947 2 Sheets-Sheet 2

INVENTOR
ROY M. MAGNUSON
BY Harper Allen
ATTORNEY

Patented July 24, 1951

2,561,477

UNITED STATES PATENT OFFICE 2,561,477

QUICK FREEZE APPARATUS AND METHOD

Roy M. Magnuson, Campbell, Calif., assignor of one-third to George H. Ballantyne, San Jose, Calif., and one-third to Cassius L. Kirk, Bozeman, Mont.

Application February 19, 1947, Serial No. 729,544

9 Claims. (Cl. 62—114)

This invention is concerned with quick freeze apparatus and relates more particularly to quick freeze apparatus in which the material to be frozen is subjected to pressure during the freezing operation.

It is a general object of the invention to provide quick freeze apparatus in which the material being frozen is subjected to a controlled pressure during the freezing operation.

A further object of the invention is to provide quick freeze apparatus of the above character in which the pressure is applied to the product through the refrigerating surfaces.

Another object of the invention is to provide quick freeze apparatus of the type employing relative movement between a package to be frozen and the freezing surfaces during the freezing operation which attains the foregoing objects.

Still another object of the invention is to provide a freezing tunnel capable of handling packages having irregularities along their surface.

Other objects and advantages of the invention will be apparent from the following description of a preferred embodiment thereof, as illustrated in the accompanying drawings, in which.

Figure 1:
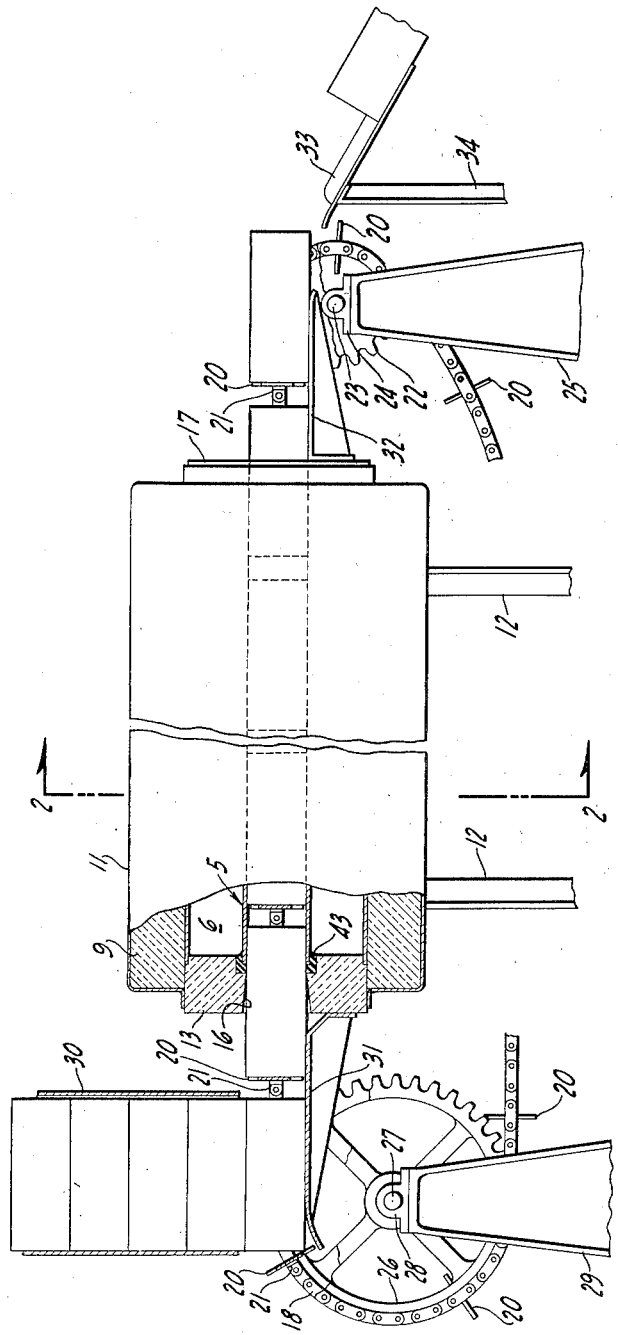
Figure 1 is a side elevational view partially in section of quick freeze apparatus embodying the instant invention.

Referring to the drawings, the apparatus includes a quick-freeze tube or tunnel 5 of rectangular cross-section formed of four refrigerating walls or surfaces which form the inner walls of a refrigerant chamber 6 that completely surrounds the tunnel. The structure of the tunnel or tube 5 is described in greater detail hereinafter. A suitable refrigerant such as brine is supplied to the chamber 6 through an inlet pipe 7 and is withdrawn through an outlet pipe 8, which with the chamber 6 form part of a refrigerant circulating or cycling system including a brine refrigerating machine (not shown). The refrigerant chamber 6 is, in turn, surrounded by a suitable layer of insulating material 9 contained within a casing 11 supported by legs or standards 12.

At the feed end of the tunnel 5, a block of insulating material 13 is provided having a flared entrant opening 16 to the tunnel 5, and a similar apertured block of material 17 is provided at the discharge end. The respective blocks 13 and 17 are preferably recessed to receive respective rubber support and seal rings 43 in which the ends of the tube 5 are seated.

In order to progress the packages of food through the freezing tunnel, an endless conveyer is provided including a pair of spaced apart chains 18 engaging in respective longitudinal recesses or tracks 19 formed in the side walls of the tunnel 5. A series of progressors or impellers 20 are secured in spaced relation between the chains 18 by brackets 21, the spacing between the progressors corresponding to one or more lengthwise dimensions of the packages of the food. As shown, the progressors 20 are spaced apart to receive one package between each adjacent pair of progressors.

The respective chains 18 engage similar drive sprockets 22 carried by a drive shaft 23 which is journalled in suitable bearings 24 carried by respective supporting standards 25. The drive shaft 23 may be connected in any suitable manner to a source of power, such as an electric motor (not shown). At the feed end of the apparatus, the chains 18 engage a pair of idler sprockets 26 which are secured on a shaft 27 also journalled in suitable bearings 28 carried by respective standards 29.

To feed packages to the conveyer for progression through the tunnel, a feed hopper 30 is provided which contains a stack of packages, the bottom package of which rests upon a feed ramp 31 for engagement by a progressor 20, so that by maintaining a stack of food packages within the hopper 30 an automatic gravity feed of the packages to the conveyer is insured. At the discharge end of the tunnel a discharge ramp 32 is provided leading to a discharge chute 33 supported by suitable standards 34. The structure described above is of the general character disclosed and claimed in the copending application of Cassius L. Kirk, Serial No. 603,715, filed July 7, 1946 for Quick Freeze Method and Apparatus.

In accordance with the instant invention, the quick freeze tunnel 5 is of special flexible or resilient construction to provide for application of a selected pressure to the tunnel and to the packages of food therein during the freezing operation. The means for applying the pressure may include a suitable pump 41 (Figure 2) having its discharge connected to the inlet pipe 7 of the refrigerant chamber 6, and an adjustable pressure regulator 42 of conventional construction connected to the discharge outlet or pipe 8 of the refrigerant chamber. By proper setting of the regulator 42 the liquid refrigerant in the chamber 6 is placed under a selected pressure and correspondingly this pressure is transmitted through the refrigerating tunnel 5 to the packages of food.

Figure 2:
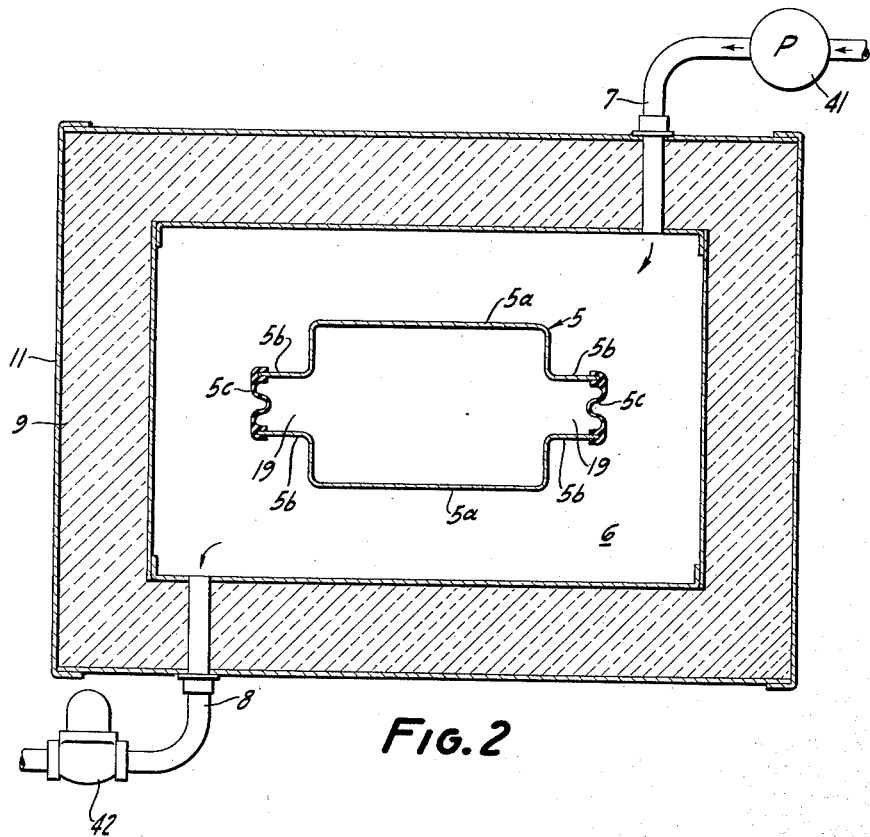
Figure 2 is a transverse sectional view of the apparatus taken as indicated by the line 2—2 in Figure 1.

Referring to Figure 2, the refrigerating tunnel 5 is shown as constructed of upper and lower similar sections 5a of sheet metal which are formed to receive a food package of rectangular outline and to provide projecting side flanges 5b forming the respective tracks 19. The side flanges 5b are connected by a flexible strip 5c which may be of rubber bonded to the flanges 5b or of a corrugated metallic construction brazed or welded thereto. This flexible or yieldable tunnel construction provides for application or transmission of the pressure to the packages of material being progressed through the tunnel.

Figure 3:
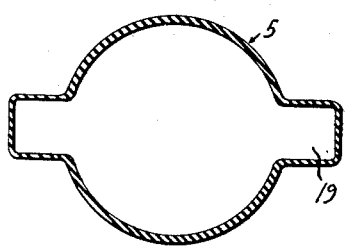
Figure 3 is a transverse sectional view of a modified form of freeze tube or tunnel.
Figure 4:
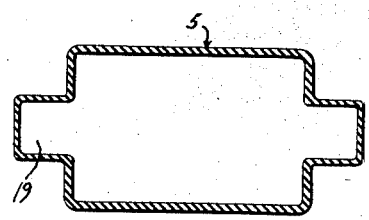
Figure 4 is a transverse sectional view of another modified form of freeze tunnel.

Figures 3 and 4 are illustrative of tunnel constructions for the cylindrical and rectangular contours respectively which are formed of a resilient material such as natural or synthetic rubber and preferably of a resilient material impregnated with a conducting material such as rubber impregnated with powdered metal. A tube or tunnel of resilient material enables use of a carton or package having end ridges, such as the conventional form of cylindrical ice cream carton having a cap closure, or a frozen food carton having a cardboard or paper body and metallic end closures. In either case the flexible tube will yield to pass the protruding portion while maintaining engagement with the body of the package.

Figure 5:
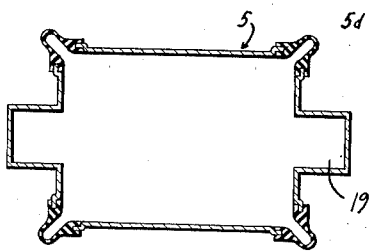
Figure 5 is a transverse sectional view of a further modified form of freeze tunnel.

In the Figure 5 construction, the four side walls are formed of sheet metal and are joined by four similar longitudinal U-shaped resilient strips 5d of rubber or the like which is bonded to the metal to provide a liquid-tight tunnel.

With each of the above freezing tunnel or tube constructions the respective top and bottom walls of the tunnel are flexible or relatively movable to enable application of the desired amount of pressure to enhance the freezing operation by compacting of the material within the package and by insuring good contact between the package and the material therein. In each instance the tunnels are provided with tracks for the conveyer elements which progress packages through the tunnel while providing a large amount of surface contact between the walls of the tunnel and the packages of material being frozen.

While I have shown certain preferred embodiments of the invention, it will be understood that the invention is capable of variation and modification from the form shown so that its scope should be limited only by the scope of the claims appended hereto.

I claim:

1. In quick freeze apparatus, a tank containing a fluid refrigerant, a flexible fluid-tight freezing structure extending through the tank below the level of said refrigerant in heat-conducting relationship with the refrigerant, means for progressing material through the structure, and means for applying pressure to the refrigerant and thereby to material in the freezing structure.

2. In quick freeze apparatus, a tank containing a fluid refrigerant, a flexible fluid-tight freezing structure extending through the tank below the level of said refrigerant comprising a pair of opposed freezing surfaces in heat-conducting relationship with the refrigerant, means for progressing material through the structure, and means for applying pressure to the refrigerant and thereby to the freezing surfaces and the material in the freezing structure.

3. In quick freeze apparatus, a flexible stationary tubular freezing structure, means for progressing material through the structure in sliding contact with the walls thereof, and means for applying refrigerant under pressure to the freezing structure for compressing and freezing the material therein.

4. In quick freeze apparatus, a tank containing a fluid refrigerant, a flexible fluid-tight freezing tube extending through the tank below the level of said refrigerant having a track therein, material progressing means including an element disposed in the track, and means for applying pressure to the tube and thereby to material being progressed through the tube.

5. In quick freeze apparatus, a tank containing a fluid refrigerant, a flexible fluid-tight freezing tube extending through the tank below the level of said refrigerant, material progressing means extending through the tube, and means for applying pressure to the tube.

6. In quick freeze apparatus, a tank containing a fluid refrigerant, a flexible fluid-tight freezing tube extending through the tank, below the level of said refrigerant, material progressing means extending through the tube, and means for applying pressure to the refrigerant and thereby to the tube and the material therein.

7. In quick freeze apparatus, a tank containing a fluid refrigerant a flexible fluid-tight freezing tube formed of metal-impregnated rubber and extending through the tank below the level of said refrigerant, material progressing means extending through the tube, and means for applying pressure to the refrigerant and thereby to the tube and the material therein.

8. In quick freeze apparatus, a tank containing a refrigerant, a flexible fluid-tight freezing tube extending through the tank below the level of said refrigerant comprising opposed metallic freezing surfaces and flexible means joining said surfaces, and means for applying pressure to the surfaces for transmission to material within the tube.

9. In quick freeze apparatus, a flexible freezing structure comprising a pair of relatively movable opposed freezing surfaces, means for progressing material between the surfaces, and means for applying pressure to the freezing surfaces to compact the material as it is progressed therethrough.

ROY M. MAGNUSON.

REFERENCES CITED

The following references are of record in the file of this patent:

UNITED STATES PATENTS

| Number | Name | Date |
|---|---|---|
| 1,940,164 | Comer | Dec. 19, 1933 |
| 1,953,520 | Vogt | Apr. 3, 1934 |
| 2,014,550 | Birdseye et al. | Sept. 17, 1935 |
| 2,103,544 | McWade | Dec. 28, 1937 |
| 2,254,406 | Zarotschenzeff | Sept. 2, 1941 |
| 2,286,514 | Stebbins | June 16, 1942 |
| 2,324,517 | King | July 20, 1943 |

FOREIGN PATENTS

| Number | Country | Date |
|---|---|---|
| 430,082 | Great Britain | June 7, 1935 |